US012650080B1

(12) United States Patent
Commarmot et al.

(10) Patent No.: US 12,650,080 B1
(45) Date of Patent: Jun. 9, 2026

(54) PROCESS FOR BONDING A HEATING MAT TO A TURBOMACHINE BLADE

(71) Applicants: SAFRAN AIRCRAFT ENGINES, Paris (FR); SAFRAN AEROSPACE COMPOSITES, Rochester, NH (US)

(72) Inventors: Manon Claire Pascale Commarmot, Moissy-Cramayel (FR); Clémence Bernardi, Moissy-Cramayel (FR); Cali Lapenta, Moissy-Cramayel (FR); Alexandre Rene Roger Bedle, Moissy-Cramayel (FR); Melissa Withers, Moissy-Cramayel (FR); Steve Wallace, Moissy-Cramayel (FR)

(73) Assignees: SAFRAN AIRCRAFT ENGINES, Paris (FR); SAFRAN AEROSPACE COMPOSITES, Rochester, NH (US)

( * ) Notice: Subject to any disclaimer, the term of this patent is extended or adjusted under 35 U.S.C. 154(b) by 0 days.

(21) Appl. No.: 19/280,900

(22) Filed: Jul. 25, 2025

(51) Int. Cl.

| | |
|---|---|
| *F01D 5/18* | (2006.01) |
| *B29C 65/00* | (2006.01) |
| *B29C 65/02* | (2006.01) |
| *B29C 65/48* | (2006.01) |
| *F01D 5/28* | (2006.01) |
| *B29L 31/08* | (2006.01) |

(52) U.S. Cl.
CPC .............. *F01D 5/18* (2013.01); *B29C 65/02* (2013.01); *B29C 65/4835* (2013.01); *B29C 66/7428* (2013.01); *F01D 5/282* (2013.01); *B29L 2031/082* (2013.01); *F05D 2230/23* (2013.01); *F05D 2300/603* (2013.01)

(58) Field of Classification Search
CPC ... F01D 5/18; F01D 5/28; F01D 5/282; B29C 65/02; B29C 65/4835; B29C 66/7428; B29L 2031/082; F05D 2230/23; F05D 2300/603
See application file for complete search history.

(56) References Cited

U.S. PATENT DOCUMENTS

| | | | | |
|---|---|---|---|---|
| 3,281,578 | A | * | 10/1966 | Chapman, Jr. .......... B22F 7/062 |
| | | | | 219/528 |
| 11,059,209 | B1 | * | 7/2021 | Troiano .............. B29C 45/2669 |
| 2008/0185454 | A1 | * | 8/2008 | Vontell ...................... F01D 5/18 |
| | | | | 237/28 |
| 2019/0291355 | A1 | * | 9/2019 | Blanc .......................... C09J 7/38 |
| 2023/0160307 | A1 | * | 5/2023 | Zheng .................... F01D 5/147 |
| | | | | 415/148 |

FOREIGN PATENT DOCUMENTS

| | | | | |
|---|---|---|---|---|
| EP | 0807514 | A2 * | 11/1997 | .......... B29C 70/467 |
| GB | 2616679 | A * | 9/2023 | ............. C08G 59/50 |

OTHER PUBLICATIONS

Koori, Masumi, et al. "Metal-Carbon Fiber Reinforced Resin Material Composite and Production Method for Metal-Carbon Fiber Reinforced Resin Material Composite" WO 2019/194199 WIPO, Oct. 10, 2019 (Year: 2019).*

* cited by examiner

*Primary Examiner* — Nathaniel E Wiehe
*Assistant Examiner* — Joshua R Beebe
(74) *Attorney, Agent, or Firm* — CUSHMAN PARTNERS, LLC

(57) ABSTRACT

A process for bonding an elastomer multilayer with integrated heating system and a thermosetting elastomer surface layer to at least one of the surfaces of a composite and/or titanium-based alloy substrate by an epoxy adhesive film
(Continued)

having a curing temperature enabling complete crosslinking,
of less than or equal to 126° C.

8 Claims, 2 Drawing Sheets

[Fig. 1]
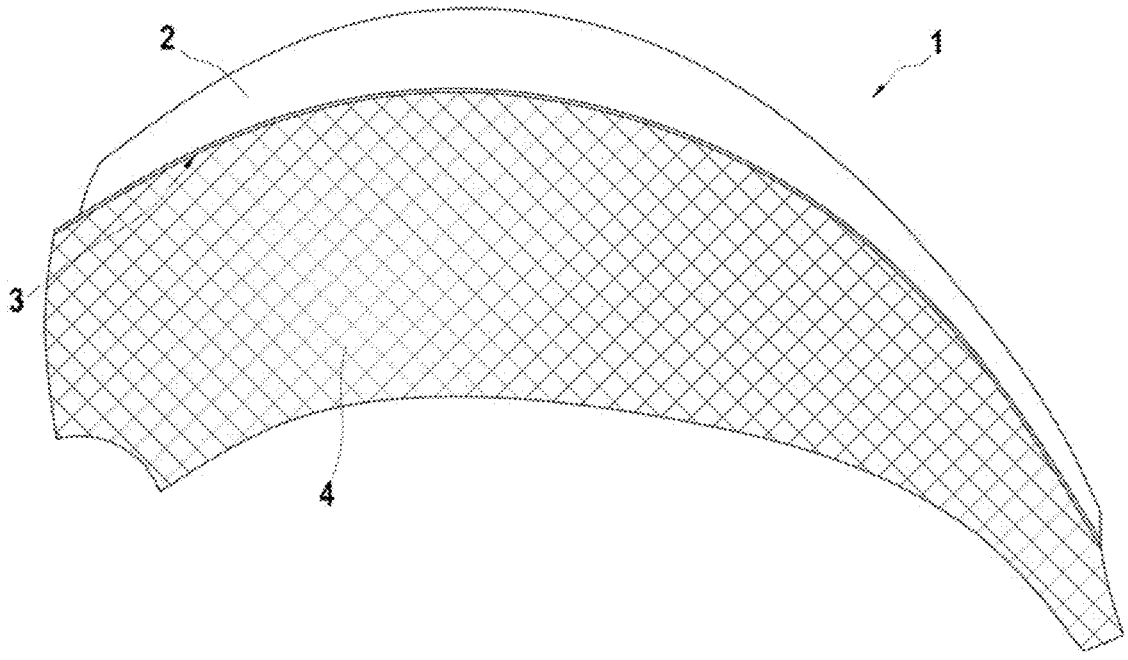
[Fig. 2]
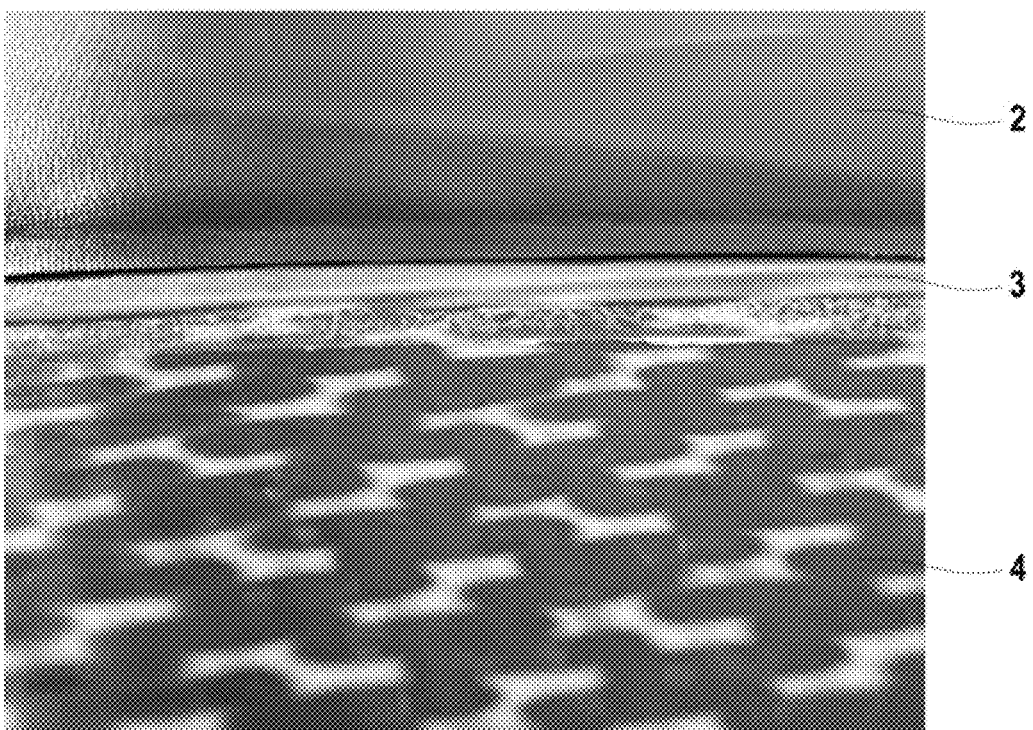

[Fig. 3]
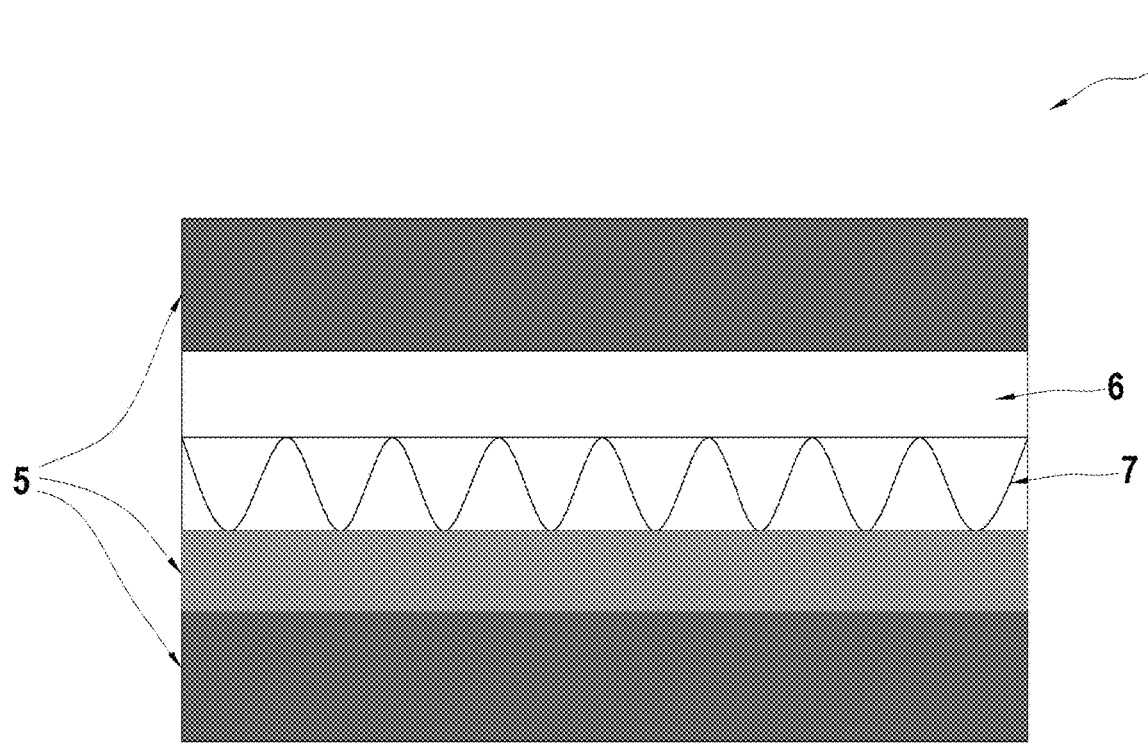

PROCESS FOR BONDING A HEATING MAT TO A TURBOMACHINE BLADE

FIELD

The present invention relates to the general field of gas turbine blades and vanes for aeronautical engines, which are made of composite material and, more particularly, to a process for bonding a heating mat to such a blade or vane, as well as to a blade or vane to which a heating mat is bonded.

The field of application of the invention is that of fan blades, aircraft turbomachine propeller blades and turbomachine outlet guide vanes (or OGVs).

BACKGROUND

In order to optimise their weight and mechanical performance, the fan blades and flow straighteners of these engines are generally made from organic matrix composite (OMC) materials, i.e. composed of a carbon fibre woven textile preform densified by hot injection under pressure of a thermosetting polymer resin, such as a polyepoxide resin. Since these OMC parts are located in the airflow passing through the engine, they are subject to erosion and impacts from foreign objects (gravel from the runway, hailstones, birds, etc.).

The most innovative type of aircraft turbomachine has an open rotor or propfan. This type of engine, equipped with a slower rotating fan, is particularly susceptible to frost and ice accretion phenomena under certain flight conditions, and must be fitted with a de-icing or anti-icing system, in particular on the blades and vanes.

This type of problem is also encountered with all blades and vanes, whether static (non-rotating, such as outlet guide vanes (OGVs)) or moving (e.g. fan blades, propeller blades), on fans, compressors or turbomachine turbines, in particular on the ducted turbomachines more common in aerospace.

The propeller blades or outlet guide vanes OGV comprise an elastomer heating mat to enable de-icing. The elastomer heating mat is bonded directly to the composite in order to de-ice the blades or vanes.

Currently, in order to bond the elastomer heating mat to a turbomachine blade or vane, it is necessary to use a primer and neoprene adhesive system, which requires the following process:

preparing the composite surface;

applying primer to the composite;

applying two coats of adhesive to the mat and the composite, with a drying time in-between;

brightening the mat side and the composite side using a solvent;

bonding to one face of the composite using a roller, section by section, protecting the areas already bonded to prevent them from bonding prematurely to the composite;

bonding on the other face in the same way;

touching up bubbles by removing the affected areas using a solvent, and then re-bonding;

cutting excess lengths;

applying filler, smoothing and drying;

applying varnish.

Such a process is extremely manual, requires a great deal of expertise, is long (usually 5 working days) due to the drying time of the adhesive and primer.

difficult to implement because of the frequent presence of bubbles that need to be removed, uses chemicals which are CMR (carcinogenic, mutagenic, toxic to reproduction) and therefore require very specific personal protective equipment, does not allow easy control of the thickness of the bonded joint (primer+adhesives), which is therefore inhomogeneous, can cause blistering in the bonded joint due to trapped brightening solvents, has poor bonding controllability due to the many interfaces between the composite and the mat (many layers of adhesive and primer).

SUMMARY

It is therefore desirable to find a process that is simpler to implement, shorter, can be industrialised on a large scale, solves the major problems mentioned above and, in particular, uses few CMR chemicals, makes it possible to obtain a homogeneous thickness of adhesive in order to generate a smooth surface finish and enables better control of the bonding to be obtained.

The inventors realised that it was possible to solve these various problems by using, instead of the neoprene adhesive, an epoxy adhesive film having a curing temperature enabling complete crosslinking, of less than or equal to 126° C.

Specifically, such an adhesive film has the benefits of:

no longer requiring the use of a primer, which shortens the bonding process;

no longer requiring the use of brightening and priming solvents, which avoids the use of CMR chemicals;

facilitating the bonding process, because the film can be repositioned if bubbles are present, without having to use a solvent;

simplifying the process by eliminating some of the steps and using a single layer of adhesive;

improving bonding quality with a homogeneous thickness of adhesives that produce a smooth surface finish, and improving the controllability of bonding by reducing the number of interfaces.

An aspect of the invention therefore relates to a process for bonding an elastomer multilayer having an integrated heating system and a thermosetting elastomer surface layer, to at least one of the surfaces of a composite and/or titanium-based alloy substrate, said process comprising the following steps:

A—preparing at least one surface of a composite and/or titanium-based alloy substrate;

B—applying an epoxy adhesive film having a curing temperature enabling complete crosslinking, of less than or equal to 126° C., to the surface of the substrate prepared in step A, C—positioning an elastomer multilayer with integrated heating system and a thermosetting elastomer surface layer, so that said thermosetting elastomer surface layer is in contact with the surface of the substrate coated with the adhesive, obtained in step B, D—placing the substrate-adhesive-multilayer assembly obtained in step C in a vacuum bag and applying a vacuum for a time period of between 5 and 15 minutes, advantageously for 15 minutes.

E—heating the substrate-adhesive-multilayer assembly obtained in step D in a vacuum bag in an autoclave to the polymerisation temperature of the adhesive (for example 121±5° C.), at a relative pressure in the vacuum bag of less than-0.02 MPa, in particular for a time period which makes it possible to approach total crosslinking of the adhesive film, for example a time period on the temperature plateau of at least 70 minutes, F—recovering the total bonded assembly composed of a composite or titanium-based alloy substrate, to at least one of the surfaces of which an elastomer multilayer with integrated heating system and a thermosetting elastomer surface layer is bonded.

According to the invention, "elastomer multilayer with integrated heating system and a thermosetting elastomer surface layer" means any elastomer multilayer with integrated heating system that has been preformed so as to match the shape of the surface of the substrate to which it is to be bonded and having a thermosetting elastomer surface layer on the portion intended to be in contact with the substrate. The elastomer multilayer according to the invention is flexible, i.e. it is not rigid. In particular, it is an elastomer de-icer, more particularly a thermoelectric elastomer de-icer, for example a heating mat, and in particular the thermosetting elastomer surface layer is called the inner ply. In particular, the thermosetting elastomer surface layer may be made of neoprene (or polychloroprene) or polyurethane. In particular, the elastomer multilayer according to the invention withstands temperatures of up to 126° C. without degradation of its materials.

According to the invention, "composite and/or titanium-based alloy substrate" means any substrate for which the surface or surfaces to which the elastomer multilayer according to the invention is intended to be bonded are made of composite or titanium-based alloy, or have portions made of composite and portions made of titanium-based alloys. In particular, the substrate according to the invention is made entirely of composite and/or titanium-based alloy, i.e. it is made entirely of composite or entirely of titanium-based alloy or consists of a portion made entirely of composite and a portion made entirely of titanium-based alloy.

The substrate according to an embodiment of the invention may be made of a composite material. Beneficially, this may be an organic matrix composite (OMC), ceramic matrix composite (CMC) or metal matrix composite (MMC). In particular, the substrate is made of an organic matrix composite (OMC).

Ceramic matrix composite substrates are well known to a person skilled in the art. The fibrous reinforcement of CMCs is based on carbon fibres or silicon carbide fibres, sometimes aluminium oxide or alumina fibres ($Al_2O_3$), or mixed crystals of alumina and silicon oxide or silica ($SiO_2$) called mullite ($3Al_2O_3,2SiO_2$), densified by a ceramic matrix such as, for example, a matrix based on alumina, mullite, carbon or silicon carbide.

Organic matrix composite substrates are also well known to a person skilled in the art. They generally consist of a fibrous reinforcement densified by an organic matrix such as a thermosetting resin (the resin, which is liquid or solid at room temperature, hardens under the effect of temperature: this transformation is irreversible. For example epoxy, polyimides, polyesters or polyurethanes), or thermoplastic (a solid resin in powder form that melts when heated and hardens again after cooling: this transformation is reversible. For example (PEEK) polyether ether ketone, PEKK (polyetherketoneketone), polyarylether ketone, polyetherimide, polycarbonate, polyolefin (polyethylene or polypropylene), PVC (polyvinyl chloride) and polystyrene, in particular selected from an epoxy resin, polyimide, and polyurethane (thermosetting resins) or a PEEK (polyetheretherketone), PEKK (polyetherketoneketone), polyarylether-ketone, polyetherimide, polycarbonate, polyolefin (polyethylene or polypropylene), PVC (polyvinyl chloride) and polystyrene (thermoplastic resins) resin, or a bismaleimide or cyanate-ester resin, more particularly an epoxy resin.

The substrate according to an embodiment of the invention can be made of a titanium-based alloy. For the purposes of this invention, "titanium-based alloy" shall mean any alloy containing titanium as the main chemical element (more than 50% by mass compared with the total mass of the alloy) and also containing other chemical elements.

In an embodiment, the titanium-based alloy according to the invention contains aluminium, in particular it contains aluminium and vanadium, more particularly it is the Ti-6Al-4V alloy also known as the TA6V alloy.

In particular, the substrate according to an embodiment of the invention is made of an organic matrix composite and/or a TA6V alloy.

In particular, the substrate according to an embodiment of the invention is a turbomachine blade or vane. In particular, the substrate according to an embodiment of the invention is a turbomachine fan blade or a turbomachine propeller blade, more particularly for an aircraft turbomachine. In particular, it is a static vane (e.g. non-rotating such as a turbomachine outlet guide vane (OGV)) or a moving blade (e.g. fan blade or propeller blade), a compressor or turbine blade, more particularly for a turbomachine, in particular for a ducted turbomachine, or for a propfan.

In particular, the substrate according to an embodiment of the invention is a turbomachine fan blade, a turbomachine outlet guide vane or a turbomachine propeller blade.

The substrate according to an embodiment of the invention can be a static OMC OGV-type vane or a moving blade such as a fan blade or propeller blade, the upper portion of which may have a bonded portion of TA6V at 150° C.±5° C.

For the purposes of this invention, "epoxy adhesive film having a curing temperature enabling complete crosslinking, of less than or equal to 126° C." means any epoxy adhesive in the form of a film, for which the curing cycle enabling complete crosslinking of the adhesive (and therefore its bonding properties) always takes place at temperatures of less than or equal to 126° C. In particular, it is a "class 120" epoxy adhesive.

In particular, the epoxy adhesive film according to an embodiment of the invention having a curing temperature enabling complete crosslinking, of less than or equal to 126° C. is commercially available under the name LOCTITE EA 9696 from HENKEL.

Step A of the process according to an embodiment of the present invention consists in preparing at least one surface of the substrate made of a composite and/or a titanium-based alloy. It can be implemented by any process well known to a person skilled in the art, such as sandblasting or the use of sandpaper. This step may be followed by a water break test, which is well known to a person skilled in the art.

Step B of the process according to an embodiment of the present invention consists in applying the epoxy adhesive film according to the invention to the surface of the substrate according to the invention prepared in step A. This step can be implemented by processes that are well known to a person skilled in the art, such as the use of a heat gun.

Step B may be preceded by masking the portions of the substrate close to the surface to which the adhesive film will be applied, in order to protect them.

Step C of the process according to an embodiment of the present invention consists in positioning the elastomer multilayer with integrated heating system and a thermosetting elastomer surface layer according to the invention so that said thermosetting elastomer surface layer of the multilayer is in contact with the surface of the substrate coated with the adhesive film obtained in step B. In the event of incorrect positioning, the elastomer multilayer can be repositioned several times, without affecting the quality of the bond.

Step D of the process according to an embodiment of the present invention consists in placing the substrate-adhesive-multilayer assembly obtained in step C in a vacuum bag and applying a vacuum, in particular with a vacuum of less than −0.002 MPa (relative), for a time period of between 5 and 15 minutes, for example for a time period of 15 minutes. This step enables the adhesive film to be placed on the substrate according to the invention and on the multilayer according to the invention and to begin to adhere.

Step E of the process according to an embodiment of the present invention consists in heating the substrate-adhesive-multilayer assembly obtained in step D in a vacuum bag in an autoclave to a polymerisation temperature of the epoxy adhesive, in particular 121±5° C. (more particularly, this temperature is lower than the degradation temperature of the multilayer), and at a relative pressure in the vacuum bag of less than-0.02 MPa, in particular for a time period enabling total crosslinking of the adhesive film to be approached, for example a time period on the temperature plateau of at least 70 minutes.

In particular, the temperature of step E of the process according to an embodiment of the invention is between 116° C. and 126° C. (i.e. 121±5° C.) and the time period is at least 70 minutes on the temperature plateau. These conditions ensure optimum adhesion while avoiding damage to the structure of the multilayer according to the invention, in particular the heating mat according to the invention.

In certain cases, for example when the grammage of the epoxy adhesive film according to the invention is too low, for example less than 292.95 g/m², but also for higher grammages, it may be desirable to add, to the process according to the invention, the steps of adding filler and applying varnish to the junction area between the substrate and the multilayer not comprising epoxy adhesive. More specifically, it is possible that there may not be enough adhesive flow during step E to fill the entire junction. Thus in an embodiment, in particular when the grammage of the epoxy adhesive film according to the invention is less than 292.95 g/m², the process according to an embodiment of the invention comprises the following additional steps, after step F, of G—adding a filler at the junction between the substrate and the multilayer in order to fill the areas not comprising epoxy adhesive, and H—applying a varnish over the filler added in step G.

The fillers and varnishes that can be used in the process according to an embodiment of the present invention are well known to a person skilled in the art. These include Naftoseal MC 780 B2 filler and EP2C varnish. It will be appreciated that steps G and H are implemented by processes well known to a person skilled in the art, and in particular step G may involve smoothing and drying the filler before implementing step H.

At the end of the process according to an embodiment of the present invention, visual electrical and ultrasonic inspections can be carried out in order to check the quality of the bonding in a way that is conventional for a person skilled in the art.

Furthermore, polyurethane films, such as polyurethane mats, can also be bonded to at least one of the surfaces of a composite and/or titanium-based alloy substrate according to the invention by the same process as that of the present invention, in place of the multilayer according to the invention or at the same time as this multilayer (in a single bonding operation), in particular edge-to-edge. In the case of simultaneous bonding of a polyurethane film, such as a polyurethane mat, and the elastomer multilayer according to the invention, in particular a heating mat, step C consists in positioning the elastomer multilayer with integrated heating system and a thermosetting elastomer surface layer and the polyurethane film, in particular edge-to-edge, so that said thermosetting elastomer surface layer of the multilayer and the surface of the polyurethane film are in contact with the surface of the substrate coated with the adhesive, obtained in step B.

In this case, the substrate obtained will comprise, in addition to an elastomer multilayer with integrated heating system and a thermosetting elastomer surface layer bonded to one of the surfaces of said substrate, a polyurethane film likewise bonded to the surface of said substrate, in particular the elastomer multilayer and the polyurethane film being bonded edge-to-edge.

An aspect of the present invention also relates to a composite and/or titanium-based alloy substrate, on at least one of the surfaces of which is bonded an elastomer multilayer with an integrated heating system and a surface layer of thermosetting elastomer, by means of a crosslinked epoxy adhesive, the surface layer of said elastomer multilayer in contact with said adhesive being made of thermosetting elastomer.

The substrate, elastomer multilayer and epoxy adhesive are as described above for the bonding process.

Finally, an aspect of the present invention relates to the use of an epoxy adhesive film having a curing temperature enabling complete crosslinking, of less than or equal to 126° C., in order to bond the thermosetting elastomer surface layer of an elastomer multilayer with integrated heating system to at least one of the surfaces of a composite and/or titanium-based alloy substrate.

An aspect of the present invention also relates to the use of an epoxy adhesive film having a curing temperature enabling complete crosslinking, of less than or equal to 126° C., in order to bond a polyurethane film such as a polyurethane mat to at least one of the surfaces of a composite and/or titanium-based alloy substrate or to bond the thermosetting elastomer surface layer of an elastomer multilayer with integrated heating system and a polyurethane film, in particular edge-to-edge, to at least one of the surfaces of a composite and/or titanium-based alloy substrate.

The above mentioned features and benefits, and others, will become apparent on reading the detailed description which follows, of exemplary embodiments. This detailed description refers to the attached drawings.

BRIEF DESCRIPTION OF THE DRAWINGS

The attached drawings are schematic and primarily aim to illustrate the principles of the disclosure.

In these drawings, from one figure to another, identical elements (or parts of elements) are identified by the same reference signs.

FIG. 1 schematically shows an OGV vane to which a heating mat is bonded using the bonding process described in an embodiment of the invention;

FIG. 2 shows a photograph of the junction between the heating mat and the OMC composite of the OGV vane.

FIG. 3 schematically shows a vertical cross-section of a heating mat according to an embodiment of the invention.

DESCRIPTION OF THE EMBODIMENTS

In order to make the presentation more tangible, an example of the implementation of the bonding process according to an embodiment of the invention and an example of an obtained OGV vane to which an heating mat is bonded are described in detail below, with reference to the attached drawings. It is recalled that the invention is not limited to this example.

FIG. 1 shows the assembly 1 consisting of an OGV vane 4 to which a heating mat 2 is bonded using a crosslinked epoxy adhesive 3.

FIG. 2 shows a photograph of the junction between the heating mat 2 and the OMC composite of the OGV vane 4. The crosslinked epoxy adhesive 3 is clearly visible between the heating mat 2 and the OMC composite of the OGV vane 4.

FIG. 3 schematically shows a vertical section of the heating mat 2 comprising an integrated heating system (electric resistors 7), a calendered fabric 6 and a plurality of elastomer layers 5.

The process implemented in order to obtain the OGV vane 4 to which the heating mat 2 according to an embodiment of the invention is bonded is as follows:

- preparing the surface of the OMC OGV 4 vane using 220-grit sandpaper and performing the water break test;
- masking the OGV vane 4 up to 2 mm from the rebate line to reduce the burr;
- applying the epoxy adhesive film 3 LOCTITE EA 9696, grammage 292.95 g/m$^2$ non-woven from HENKEL, using a heat gun to promote tack;
- removing the protective film from the adhesive and positioning of the preformed Safran Aerosystems elastomer heating mat 2 on the adhesive 3, such that the inner neoprene ply of the heating mat 2 is in contact with the adhesive 3;
- placing the OGV vane-adhesive-heating mat assembly 1 in a vacuum bag under a total vacuum for 15 minutes in order to press the adhesive 3 onto the OGV vane 4 and the heating mat 2 and beginning to adhere it;
- removing the OGV vane-adhesive-heating mat assembly 1 from the vacuum bag;
- folding the adhesive 1 on itself at the rebate line to ensure that adhesive flow creates a smooth transition between the OGV vane composite 4 and the heating mat 2;
- placing the OGV vane-adhesive-heating mat assembly 1 in an autoclave in a vacuum bag and applying a temperature of 121 C±5° C. for at least 70 minutes at a relative pressure of –0.02 MPa (–200 mbars) in order to crosslink the adhesive 3 while avoiding degradation of the heating mat 2;
- removing the OGV vane-adhesive-heating mat assembly 1 from the autoclave;
- removing the masking and deburring again the joints with the adhesive, using 400-grit sandpaper;
- visual, electrical and ultrasonic inspection to check the quality of the bond.

A reduction in the drying/polymerisation time of 96% is observed compared with the prior art process: a total of 3 hours with the new process and 75 hours with the former process. A reduction in operator time of 33% was also observed. Thus, a change from 12 hours to 8 hours. No filler, varnish, primer or brightening solvent was used, yet the quality of the bond is better than with the prior art process, with a smooth transition between the composite and the heating mat. There was no damage to the heating mat wires or resistors. A strength test was carried out and there was no change compared with the strength test implemented on the OGV vane before the mat was bonded.

Although the present invention has been described by referring to specific exemplary embodiments, it will be appreciated that modifications and changes can be made to these examples without going beyond the general scope of the invention as defined by the claims. In particular, the individual features of different embodiments illustrated or mentioned can be combined in additional embodiments. Consequently, the description and the drawings should be considered as illustrating rather than limiting.

It will be appreciated that all the features described in reference to a process can be transposed, alone or in combination, to a device, and inversely, all the features described in reference to a device can be transposed, alone or in combination, to a process.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

The articles "a" and "an" may be employed in connection with various elements and components, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

A person skilled in the art will readily appreciate that various features, elements, parameters disclosed in the description may be modified and that various embodiments disclosed may be combined without departing from the scope of the invention. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Having described above several aspects of at least one embodiment, it is to be appreciated various alterations, modifications, and improvements will readily occur to those skilled in the art. Such alterations, modifications, and improvements are intended to be aspects of this disclosure. Accordingly, the foregoing description and drawings are by way of example only.

The invention claimed is:

1. A process for bonding an elastomer multilayer with integrated heating system and a thermosetting elastomer surface layer to at least one of surfaces of a composite and/or titanium-based alloy substrate, said process comprising the following steps:

A—preparing at least one surface of a composite and/or titanium-based alloy substrate;

B—applying an epoxy adhesive film having a curing temperature enabling complete crosslinking, of less than or equal to 126° C., to the surface of the substrate prepared in step A, C—positioning an elastomer multilayer with integrated heating system and a thermosetting elastomer surface layer so that said thermosetting elastomer surface layer is in contact with the surface of the substrate coated with the adhesive, obtained in step B, D—placing the substrate-adhesive-multilayer assembly obtained in step C in a vacuum bag and applying a vacuum for a time period of between 5 and 15 minutes, E—heating the substrate-adhesive-multilayer assembly obtained in step D, in a vacuum bag in an autoclave to the polymerisation temperature of the adhesive and at a relative pressure in the vacuum bag of less than-0.02 MPa, F—recovering the total bonded assembly composed of a composite or titanium-based alloy substrate, on at least one of the surfaces of which an elastomer multilayer with integrated heating system and a thermosetting elastomer surface layer is bonded.

2. The process according to claim 1, wherein the thermosetting elastomer surface layer of the multilayer is made of neoprene or polyurethane.

3. The process according to claim 1, wherein the elastomer multilayer with integrated heating system and a thermosetting elastomer surface layer is a heating mat.

4. The process according to claim 1, wherein the substrate is made of an organic matrix composite and/or a TA6V alloy.

5. The process according to claim 1, wherein the substrate is a turbomachine blade or vane.

6. The process according to claim 5, wherein the substrate is a turbomachine fan blade or a turbomachine outlet guide vane or a turbomachine propeller blade.

7. The process according to claim 1, wherein the temperature of step E is 121±5° C. and the time period on the temperature plateau is at least 70 minutes.

8. The process according to claim 1, further comprising the following additional steps, after step F, of:

G—adding a filler at the junction between the substrate (4) and the multilayer (2) to fill the areas not comprising epoxy adhesive (3), and H—applying a varnish over the filler added in step G.

* * * * *